Dec. 28, 1954 W. SARAGA 2,698,420
ELECTRIC IMPEDANCE NETWORK
Filed April 24, 1953 2 Sheets-Sheet 1

INVENTOR:-
Wolja Saraga,
BY Pierce, Scheffler & Parker
ATTORNEYS.

Dec. 28, 1954 W. SARAGA 2,698,420

ELECTRIC IMPEDANCE NETWORK

Filed April 24, 1953 2 Sheets-Sheet 2

INVENTOR:-
Wolja Saraga,
BY Pierce, Scheffler & Parker
ATTORNEYS.

United States Patent Office 2,698,420

Patented Dec. 28, 1954

2,698,420

ELECTRIC IMPEDANCE NETWORK

Wolja Saraga, Orpington, England, assignor to Telephone Manufacturing Company Limited, London, England, a British company Application April 24, 1953, Serial No. 350,913

Claims priority, application Great Britain August 11, 1947

3 Claims. (Cl. 333—28)

This invention relates to variable electrical four-terminal networks, and more particularly to networks providing attenuation-frequency characteristics which can be varied by means of one or more adjustable resistances. The networks which are the subject of this invention are particularly useful as regulating networks in carrier telephone systems for the equalisation of open wire lines and cables the attenuation-frequency curves of which vary with temperature and weather conditions. This present application is a continuation-in-part of my application Serial No. 43,325, filed August 9, 1948, now Patent No. 2,636,940.

In networks for this specific purpose it is desirable that the attenuation-frequency or transfer characteristic should be variable in such manner that for different adjustments of the variable element the ratios of the changes of attenuation at each frequency from a reference curve are the same, i. e. do not depend on such adjustment. In other words, a network is required the attenuation-frequency characteristic of which, over a specified frequency range, is given by:

$$\alpha(f)=\alpha_0(f)+K\alpha_v(f) \qquad (1)$$

where $\alpha$, $\alpha_0$ and $\alpha_v$ are attenuation functions of the frequency $f$ and K is a numerical factor say between $-1$ and $+1$, which is independent of frequency.

It has been shown that characteristics of this type can be obtained approximately in four-terminal networks having attenuation characteristics variable in accordance with the relation:

$$\alpha=\alpha_0+20\log_{10}\left|\frac{1+\gamma A}{\gamma+A}\right| \qquad (2)$$

where $\alpha$ is the attenuation in decibels $\alpha_0$ and A are specified functions of the frequency and $\gamma$ is a real parameter depending on the values of the variable network element or elements but not on frequency.

It is an object of the present invention to provide a four terminal network in which this attenuation characteristic can be obtained and varied and according to the invention such a network can be obtained by using a four terminal network comprising a variable impedance network N with impedance $Z_n$ and arranging for the current in $Z_n$ to be substantially independent of the value of $Z_n$, and making $Z_n$ to depend on frequency in accordance with the following expression:

$$Z_n=Z_0\frac{\gamma+A}{1+\gamma A} \qquad (3)$$

where $\gamma$ and A are as defined above and where $Z_0$ depends on the desired function $\alpha_0$.

Figure 1:
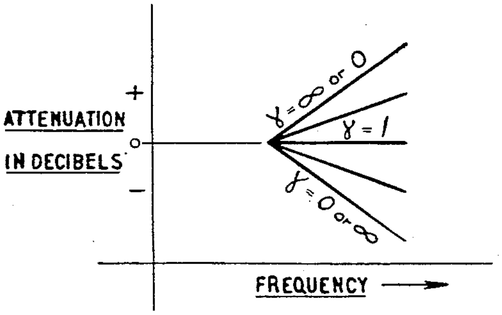
Figure 2:
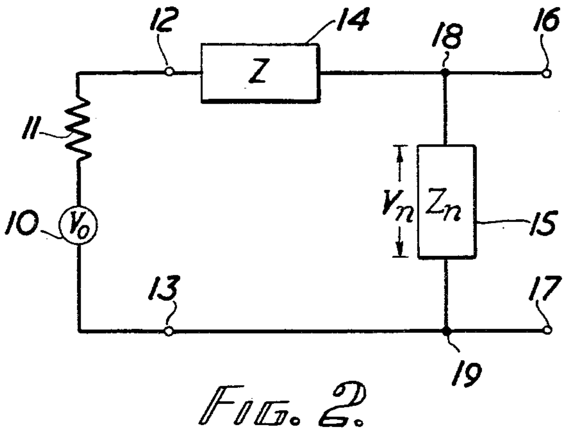
Figure 3:
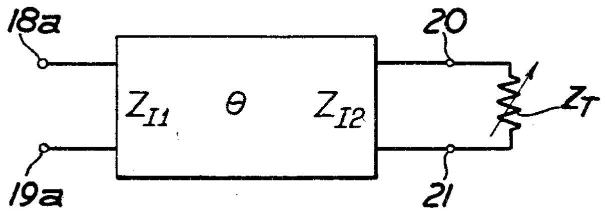
Figure 4:
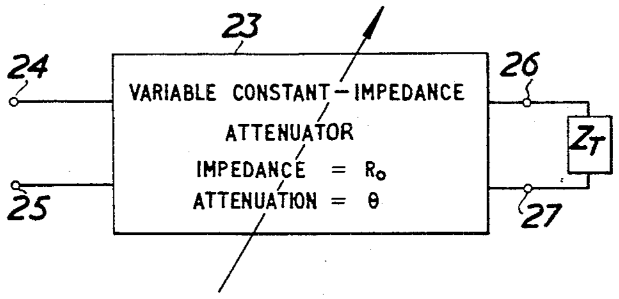
Figure 5:
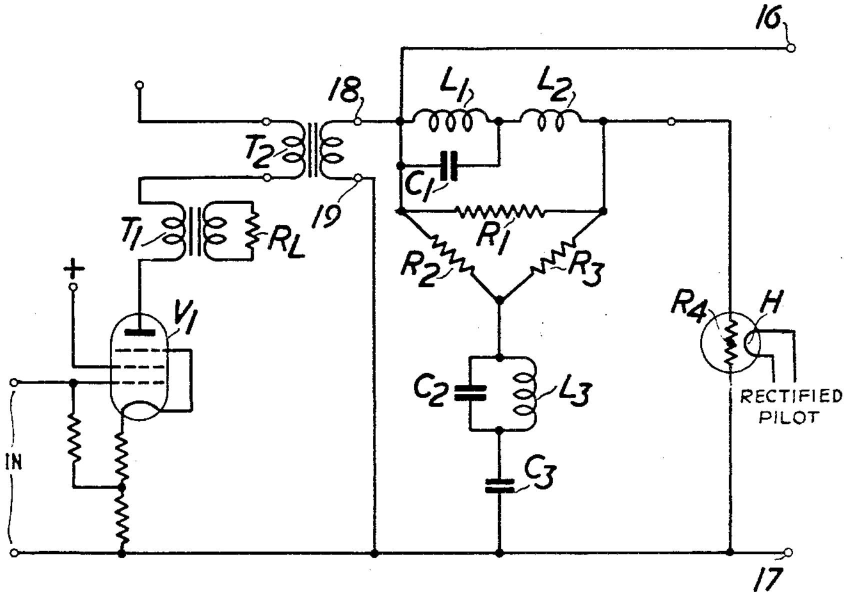

In the accompanying drawing, Figure 1 is a diagram indicating an example of an attenuation-frequency characteristic which it may be the object of the invention to attain as closely as possible, Figure 2 shows diagrammatically a complete network according to the invention, and Figures 3 to 5 alternative variable networks for incorporation in the complete network.

Figure 1 shows the variable part $K\alpha_v(f)$ of a series of attenuation-frequency characteristics over a limited range which it may be the object of a network according to the invention to attain as closely as possible. This diagram indicates attenuation in decibels plotted against frequency, and the object of the invention is to provide a network the characteristic of which can be varied to approximate any of those shown or any of the intermediate curves. In Figure 1 the individual characteristics are shown as straight lines, but they can be curved, subject to the relation set out in Equation 1.

In Figure 2 a source 10 of alternating voltage is applied through a resistance 11 representing the internal resistance of the source 10, to the input terminals 12, 13 of a four-terminal network comprising a series impedance 14 of value Z and a variable shunt impedance 15 of value $Z_n$, the output terminals of the network being indicated at 16, 17.

Various networks may be used for the impedance 15, and one such network is indicated diagrammatically in Figure 3. This comprises a four-terminal network with input terminals 18, 19 and output terminals 20, 21, the latter being joined by a variable resistance 22; the impedance presented by the network at its terminals 18, 19 is used for the impedance 15.

With an impedance network such as that shown in Figure 3, it can be shown that if in the general case the network is terminated by an impedance of value $Z_T$, the impedance presented by the network to the terminals 18, 19, that is the impedance looking toward the network is given by:

$$Z\text{ input}=Z_{11}\frac{(Z_T/Z_{12})+\tanh\theta}{1+(Z_T/Z_{12})\tanh\theta} \qquad (4)$$

where $\theta$ is the image transfer constant, $Z_{11}$ is the input image impedance and $Z_{12}$ is the output image impedance (looking toward the network).

It will be seen that if $$Z_{11}=Z_0$$
$$Z_T/Z_{12}=\gamma \qquad (5)$$
$$\tanh\theta=A$$

then $$Z\text{ input}=Z_0\frac{\gamma+A}{1+\gamma A} \qquad (6)$$
$$=Z_n$$

as defined by Equation 3.

In this way a four-terminal network, designed in accordance with the relations given by Equations 5 above, is suitable for use as the network 15 in accordance with the invention.

If such a network is included in series with a source of voltage $V_0$, having an internal resistance $R_1$, and a fixed impedance Z, as shown in Figure 2, the voltage $V_n$ across impedance $Z_n$ is given by:

$$V_n=V_0\frac{Z_n}{R_1+Z+Z_n} \qquad (7)$$

If $(R_1+Z)$ is sufficiently large in comparison with $Z_n$:

$$V_n=V_0\frac{Z_n}{R_1+Z} \qquad (8)$$

In order to make $(R_1+Z)$ large enough it is sufficient to make either $R_1$ or Z large enough, but it is of course permissible to make both $R_1$ and Z large. In practice $R_1$ may be the anode-cathode impedance of a valve, say a triode or a pentode and the E. M. F. $V_0$ may be applied to the signal grid of the valve. In this case the effective E. M. F. is $\mu V_0$ where $\mu$ is the amplification of the valve.

From Equations 6 and 8 above $$V_n=V_0\frac{Z_0\frac{\gamma+A}{1+\gamma A}}{R_1+Z} \qquad (9)$$

The attenuation can be defined as $$\alpha=20\log_{10}\left|\frac{\text{reference voltage}}{V_n}\right| \qquad (10)$$

If ½$V_0$ is taken as reference voltage, we obtain $$\alpha=20\log_{10}\left|\frac{R1+Z}{2Z_0}\cdot\frac{1+\gamma A}{\gamma+A}\right|$$
$$=20\log_{10}\left|\frac{R1+Z}{2Z_0}\right|+20\log_{10}\left|\frac{1+\gamma A}{\gamma+A}\right| \qquad (11)$$

If $20\log_{10}\frac{R1+Z}{2Z_0}$ is called $\alpha_0$ $$\alpha=\alpha_0+20\log_{10}\left|\frac{1+\gamma A}{\gamma+A}\right| \qquad (12)$$

This expression will be seen to be in accordance with Equation 2 above, showing that the desired result is obtained. It will be apparent that in order to utilise the voltage $V_n$ which appears across impedance $Z_n$ it is necessary to use an associated load circuit impedance which is high compared with $Z_n$; the input circuit of a thermionic valve is a suitable load circuit.

In the foregoing it is important to note that $\gamma$ has been assumed in Equation 2 to be a real number the value of which is independent of frequency but can be varied by means of a variable resistor, and this implies that $Z_T$ is a resistance, say R. Then from Equation 5 $\gamma=R/Z_{12}$, and since R is real and independent of frequency it is necessary that $Z_{12}$ also be made a constant resistance. However, it is not necessary, though often convenient, to make also $Z_{11}$ a constant resistance. Networks can be designed with specified $\theta$, $Z_{11}$ and $Z_{12}$, and it is comparatively simple to design constant resistance networks, i. e. networks for which $\theta$ is a specified function of frequency and $Z_{11}=Z_{12}=R_0$ where $R_0$ is a specified constant resistance.

Instead of the relations given by Equations 5, the following equations will permit Equation 4 to be reduced to the required form of Equation 3:

$$Z_{11}=Z_0 \qquad \tanh\theta=\gamma \qquad Z_T/Z_{12}=A \qquad (13)$$

If this set of relations is chosen, tanh $\theta$ has to be made independent of frequency, real and variable at will in numerical value. This means that the four-terminal network can be a purely resistive attenuator with variable attenuation. $Z_T/Z_{12}$, on the other hand, has to vary with frequency. Since $Z_{12}$, for a network consisting of resistances, is a resistance which does not vary with frequency, $Z_T$ must vary with frequency, i. e. the terminating impedance must be purely or at least partially reactive. It may be noted that when the attenuation is varied the image impedances $Z_{11}$ and $Z_{12}$ must be kept constant. This makes it necessary to alter more than one of the resistances forming the attenuating four-terminal network. The resulting network is indicated diagrammatically in Figure 4; the network comprises input terminals 24, 25 and output terminals 26, 27 with the terminating impedance 28.

A second type of two-terminal impedance network which can be used with advantage for the network N is one comprising two variable resistances, a resistance $\gamma R_0$ and a resistance $R_0/\gamma$, where $\gamma$ is the parameter of variations as before and $R_0$ is a suitable reference resistance. Impedance networks of this type are shown in Figures 5 and 6 in the specification of my application Ser. No. 43,325, of which this present application is a continuation-in-part, and are claimed in that application. No claim is made herein to the networks claimed in that specification.

In designing a network for the purpose of the present invention, we must refer to Equation 12 above. In this equation we are chiefly interested in that variable part $\alpha_1=K\alpha_v$ of $\alpha$ which depends on $\gamma$ i. e. in $$\alpha_1=20\log_{10}\left|\frac{1+\gamma A}{\gamma+A}\right| \qquad (14)$$

If the network of Figure 3 is used (or the networks of Figures 5 and 6 of application Ser. No. 43,325) $\gamma$ can be varied between 0 and $\infty$. If the network of Figure 4 is used, $\gamma$ can be varied only between 0 and 1.

It will be seen that we can obtain from Equation 14 the following relation from the 3 cases: $\gamma=0$, $\gamma=1$, $\gamma=\infty$:

$$\begin{aligned}&\gamma=0,\ \alpha_1=-20\log_{10}A=-\alpha_v\\&\gamma=1,\ \alpha_1=0\\&\gamma=\infty,\ \alpha_1=+20\log_{10}A=+\alpha_v\end{aligned} \qquad (15)$$

Furthermore, it can be shown quite generally that if $\gamma$ is replaced by $$\frac{1}{\gamma}$$

$\alpha_1$ is replaced by $-\alpha_1$. Thus it can be said that the total range of variation of $\alpha_1$ has the two limiting curves $-\alpha_v$ and $+\alpha_v$ and consists of two symmetrical half-ranges 0 to $+\alpha_v$ and 0 to $-\alpha_v$. In the case of the network shown in Figure 4, only one half range can be covered.

In the case of the network shown in Figure 3 we have, from Equation 5 $A=\tanh\theta$, where $\theta$ is the image transfer constant of a network for which the image impedance $Z_I=R_0$. Thus the design problem is to find such a network for which 20 $\log_{10}|\tanh\theta|$ satisfies the specification for the required limiting attenuation-frequency curve $\alpha_v$. It will be obvious to anybody skilled in the art how to proceed to find a solution by systematic trial-and-error. If, for instance, it is assumed that the network with image transfer constant $\theta$ and image impedance $Z_I=R_0$ is a lattice network with series arm impedances Z and lattice arm impedance $R_0^2/Z$ it is obvious that the input impedance of this network when open circuited at the other end is $$\tfrac{1}{2}\left(Z+\frac{R_0^2}{Z}\right)$$

so that $$A=\frac{R_0}{\tfrac{1}{2}\left(Z+\frac{R_0^2}{Z}\right)}$$

Thus the problem to be solved is to find a network with impedance Z so that $$\frac{R_0}{\tfrac{1}{2}\left(Z+\frac{R_0^2}{Z}\right)}$$

satisfies the specification for A. This can be done by trial-and-error. If, for instance, $Z=j2\pi fL$, i. e. the impedance of an inductance L, the curves can easily be drawn for $$20\log_{10}\left|\frac{Z_n}{R_0}\right|$$

as functions of $$x=2\pi f\frac{L}{R_0}$$

and equally for $Z=R+j2\pi fL$, i. e. the series combination of a resistance R and an inductance L. From these curves other curves can be derived by replacing the inductance L by a more complicated reactive network.

It is, of course, possible to obtain the curves produced by any network of the type shown in Figure 3 by equivalent networks of the types shown in Figure 4.

So far it has been assumed that the variable resistor or resistors can be varied between 0 and $\infty$. However, if they are thermally sensitive resistors and are temperature controlled by pilot currents, the limits 0 and $\infty$ can never be reached and therefore also the limits for $\gamma$ assumed above can never be reached. This has to be taken into account in designing a network to satisfy a given specification.

An example of a practical network is shown in Figure 5. This includes a pentode tube $V_1$ to which input is applied from terminals IN; the tube has appropriate heater, screen and anode potentials applied to it in the normal way. The plate circuit of the tube includes the primary windings of two transformers $T_1$ and $T_2$, of which the secondary of $T_1$ has a load resistor $R_L$ connected across, and the secondary of $T_2$ feeds a variable attenuation network. The network used has a low impedance which by itself would produce too low a load value for tube $V_1$ but resistor $R_L$ is used to maintain the plate load at a sufficiently high value. The terminals of the secondary winding of transformer $T_2$ represent the terminals 18, 19, the valve $V_1$ presenting a voltage source of high impedance.

The impedance network includes a series inductance $L_1$, shunted by capacitor $C_1$, the combination being in series with a further inductance $L_2$. This series circuit is shunted by one arm of a resistive delta composed of resistors $R_1$, $R_2$ and $R_3$. From the free apex of the delta extends an impedance branch including an inductance $L_3$ shunted by capacitor $C_2$, the combination being in series with a further capacitor $C_3$. It may be observed in passing that the reactive series branch of the network of Figure 5 is the inverse form, with respect to $Z_0$, of the reactive shunt branch.

The characteristic is controlled by the variable terminating resistance $R_4$. This resistance can be varied automatically when the network is used as a variable attenuation equaliser. In this case the resistance is a thermistor, of the indirectly heated type and having high temperature coefficients of resistance, the temperature of the resistances being controlled in accordance with the received amplitude of a pilot signal transmitted at constant amplitude, which is rectified and fed to the heater winding H of the thermistor.

In the design of networks in accordance with the invention it is to be remembered that exact concordance of the network characteristic with the ideal as set out in Equation 1 above is not possible, so that any particular design may be dictated by specific conditions of operation, or it may be desired to attain the best possible approximation to the ideal as expressed by Equation 1. With this in mind, it is possible to analyse the design of networks in accordance with the invention but inasmuch as such analysis will be familiar to those skilled in the art, it is not considered necessary in this specification to dilate upon it.

I claim:

1. A variable impedance network having an attenuation-frequency characteristic variable in accordance with the relation:

$$\alpha=\alpha_0+20\log_{10}\left|\frac{1+\gamma A}{\gamma+A}\right|$$

where $\alpha$ is the attenuation in decibels, $\alpha_0$ and A are specified functions of the frequency and $\gamma$ is a real parameter depending upon the variable elements of the network but not on frequency; said network comprising a pair of input terminals and a pair of output terminals, a fixed impedance in series between one of said input terminals and one of said output terminals, a connection between the other of said input terminals and the other of said output terminals, and an adjustable impedance network of value $Z_n$ shunted across said output terminals and including an impedance adjustable to vary the effective value of $Z_n$ in accordance with the relation $$Z_n=Z_0\frac{\gamma+A}{1+\gamma A}$$

where $Z_0$ is a chosen value of said adjustable impedance which depends upon the desired function $\alpha_0$.

2. A variable impedance network according to claim 1, wherein the impedance of value $Z_n$ comprises a four-terminal network terminated by a variable impedance $Z_T$, the input and output image impedances of said four-terminal network being equal respectively to $Z_0$ and $Z_{12}$, the network having an image transfer constant $\theta$ in accordance with the relation $$\gamma=\frac{Z_T}{Z_{12}}$$

and $A=\tanh\theta$.

3. A variable impedance network according to claim 2, wherein the terminating impedance is a pure resistance of value R, and $\gamma=R/Z_{12}$.

References Cited in the file of this patent

UNITED STATES PATENTS

| Number | Name | Date |
|---|---|---|
| 2,019,624 | Norton | Nov. 5, 1935 |
| 2,096,027 | Bode | Oct. 19, 1937 |
| 2,304,545 | Clement | Dec. 8, 1942 |
| 2,348,572 | Richardson | May 9, 1944 |